United States Patent [19]
Colyer

[11] Patent Number: 6,023,722
[45] Date of Patent: Feb. 8, 2000

[54] HIGH-AVAILABILITY WWW COMPUTER SERVER SYSTEM WITH PULL-BASED LOAD BALANCING USING A MESSAGING AND QUEUING UNIT IN FRONT OF BACK-END SERVERS

[75] Inventor: Adrian Mark Colyer, Southampton, United Kingdom

[73] Assignee: International Business Machines Corp., Armonk, N.Y.

[21] Appl. No.: 08/899,372

[22] Filed: Jul. 23, 1997

[30]    Foreign Application Priority Data

Dec. 7, 1996 [GB] United Kingdom .................... 9625454

[51] Int. Cl.[7] ..................................................... G06F 13/00
[52] U.S. Cl. ........................... 709/201; 709/203; 709/235
[58] Field of Search ........................ 395/200.33, 200.65,
395/200.56, 200.32; 709/201, 203, 235

[56]    References Cited
    U.S. PATENT DOCUMENTS

| | | | |
|---|---|---|---|
| 4,050,095 | 9/1977 | Pettipher et al. . | |
| 4,257,099 | 3/1981 | Appelt . | |
| 5,465,328 | 11/1995 | Dievendorff et al. | 395/182.13 |
| 5,754,774 | 5/1998 | Bittinger et al. | 395/200.33 |
| 5,761,507 | 6/1998 | Govett | 395/684 |
| 5,761,663 | 6/1998 | Lagarde et al. | 707/10 |
| 5,764,916 | 6/1998 | Busey et al. | 395/200.57 |
| 5,774,660 | 6/1998 | Brendel et al. | 395/200.31 |
| 5,774,668 | 6/1998 | Choguier et al. | 395/200.53 |
| 5,790,789 | 8/1998 | Suarez | 395/200.32 |
| 5,790,800 | 8/1998 | Gauvin et al. | 395/200.57 |
| 5,793,964 | 8/1998 | Rogers et al. | 395/200.32 |

*Primary Examiner*—Krisna Lim
*Attorney, Agent, or Firm*—A. Bruce Clay

[57]    ABSTRACT

A high-availability computer server system, and method of operation thereof, capable of serving a large number of requests received from a plurality of computer client devices connected through a network to said server system, said requests specifically identifying said server system, said server system comprising: a messaging and queuing unit having an input connected to said network upon which said requests identifying said server system are received, and an output; and a plurality of server units connected in parallel to said output of said messaging and queuing unit, where each server unit pulls requests off of a queue in the messaging and queuing unit.

6 Claims, 2 Drawing Sheets

HIGH-AVAILABILITY WWW COMPUTER SERVER SYSTEM WITH PULL-BASED LOAD BALANCING USING A MESSAGING AND QUEUING UNIT IN FRONT OF BACK-END SERVERS

FIELD OF THE INVENTION

This invention is in the computer networking field. It specifically is in the field of high-availability server computer devices capable of providing the same information to a large number of client computer devices.

BACKGROUND OF THE INVENTION

Just as computers have become more and more prevalent in everyday life, networks of linked computers have become important in distributing information amongst computer users. Through such networks, computer users can share information creating a virtual publishing medium which has become a viable alternative for the print medium.

A 'network' of computers-can be any number of computers that are able to exchange information with one another. The computers may be arranged in any configuration and may be located in the same room or in different countries, so long as there is some way to connect them together (for example, by telephone lines or other communication systems) so they can exchange information. Just as computers may be connected together to make up a network, networks may also be connected together through tools known as bridges and gateways. These tools allow a computer in one network to exchange information with a computer in another network. The Internet is a network of networks having no single owner or controller and including large and small, public and private networks, and in which any connected computer running Internet Protocol software is, subject to security controls, capable of exchanging information with any other computer which is also connected to the Internet. This composite collection of networks which have agreed to connect to one another relies on no single transmission medium (for example, bidirectional communication can occur via satellite links, fibreoptic trunk lines, telephone lines, cable TV wires and local radio links).

The World Wide Web (WWW) Internet service is a wide area information retrieval facility which provides access to an enormous quantity of network-accessible information and which can provide low cost communications between Internet-connected computers. Information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994). Use of the WWW is growing at an explosive rate because of its combination of flexibility, portability and ease-of-use, coupled with interactive multimedia presentation capabilities. The WWW allows any computer connected to the Internet and having the appropriate software and hardware configuration to retrieve any document that has been made available anywhere on the Internet. The retrievable documents on the WWW include 'HyperMedia' documents—i.e. documents which may be text documents or other forms of media such as sounds and images and which have links ('Ihyperlinks') to other documents. The format of text documents on the WWW is a standard format in HTML (HyperText Markup Language), such that a document created on one operating system and hardware platform can be read by a user on any other platform that has a Web Browser (see below). Images may be stored in separate graphics files, for example in standard GIF or JPEG format, and referenced in the HTML text such that the user is prompted to retrieve the specified image files as well as the HTML text.

Users access this information using a 'Web Browser', or 'Web client', which is software installed on the user's computer and having facilities for serving or retrieving documents from a Web Server via the Internet. Currently available Web Browsers include WebExplorer from IBM Corporation and Mosaic from NCSA. Both "WebExplorer" and "Mosaic" are trademarks of the respective companies. Such Browsers include directories and search tools and understand HTML and other WWW standard formats and can display or output files correctly in these formats. The user interface of these Web Browsers is a graphical 'point-and-click' interface (i.e. items can be selected by moving a cursor across a graphical display and then pressing a mouse button). The WWW is structured as pages or files which each have a particular Universal Resource Locator (or URL). The URL denotes both the server machine and the particular file or page on that machine. The user can either specify a particular URL or jump from one URL to an associated URL by means of the 'hyperlinks'-that is, a word or symbol on a page can be associated with another URL which is selectable, for example by clicking a mouse at the relevant location, to cause the Browser to retrieve and display the relevant page. There may be many pages resident on a single server, and associated hyperlinked pages may be located on different servers. If a URL begins "http:" then this indicates that the file contains hyperlinks. "http:" stands for "hypertext transport protocol" and is the basic communication protocol by which messages are sent over the World Wide Web and "hyperlinked" together.

When a user selects a URL for a page on a Web server system using his Web Browser, a one-shot request is sent to the relevant server which performs an action specific to that page. In many cases the server responds to the request by retrieving the requested page from a database of stored pages and transmitting the HTML page back over the Internet to the WWW client for display to the user. This is performed within the scope of a single end-to-end synchronous communication session. That is, the Browser sends its request and then waits for a response before proceeding with any further processing or initiating other requests. The Browser is said to be 'blocked' or 'suspended' while it waits for the requested response. In some cases the Browser's request will lead to the server launching an application to generate the HTML, but again the one-shot request from the Browser requires a response within the scope of the present synchronous communication session since the Browser does not provide for concurrent communication sessions and no application state information is maintained between requests. A failure to access a page requested by a Browser can be signalled back to the user by means of an error message displayed on the user's terminal, but if the server is merely slow to respond then the Browser remains suspended for an indefinite period. In practice, a user may abandon the communication attempt if the delay is unacceptable to them. There is no facility within Web Browsers for automatic retry of a request.

Modern enterprises require facilities for communication with other departments within the enterprise and with associated enterprises such as customers or suppliers, who may be in a different country. The WWW Internet service can provide a partial answer to such a requirement, providing a cost effective communication medium for inter-company communications, but the WWW Internet service's one-shot request-response communication model and the lack of provision for parallel requests from a Browser can represent severe limitations if requested information is not available within an acceptable time period. It is often unacceptable for a sender system to be suspended indefinitely and it is unacceptable for the success of business-critical applications to be dependent on whether a server application responds to a request in time. The WWW Internet service does not provide facilities for assured delivery of messages which is a requirement of many business critical applications (that is, the application needs to know that a message it has sent will not be lost on its way to the target destination, and that it will only be sent once). Also, business applications may involve a conversation taking up many request-response pairs and the lack of any context information being carried over between Web Browser requests means that there is no facility for relating together requests which are part of the same business application.

Oftentimes, it is desirable to provide a single WWW server which can almost simultaneously provide the same information to a large number of WWW browsers. For example, IBM has recently provided networking facilities for the Olympic Games in Atlanta, Ga. in the USA. As part of this effort, a high-availability server was required, as many people all over the world were simultaneously trying to obtain access to the Web server to obtain information such as results of each Olympic competition. Each Web browser, from places all over the world, issued a request listing the URL of the IBM Olympic Web server. The server had to be capable of supplying a very large demand in terms of Web browser requests.

In these instances, one possible high availability server architecture is known (see Japanese Patent No. 2505116 owned by IBM) in which a load balancer is placed before a plurality of server computing devices. Each server computing device is capable of supplying the same information as the other server computing devices of the plurality. Many server devices are used in this way in order to provide the capability of serving a large amount of client browser requests. The load balancer periodically checks the status of each server device to determine how busy that server device is, and updates a data record appropriately. The load balancer then makes decisions as to which server device should serve the next incoming browser request based on the status of each server device as recorded in the data record. Each browser sends a generic request to "the server" specified in the URL and does not know how "the server" is handling the request. The large number of browsers simply are provided with the requested information in a fast and efficient manner.

However, these types of known high-availability servers suffer from drawbacks in that the load balancer only checks the status of each server device on a periodic basis, so oftentimes even though a particular server has been determined to be not busy at one instance of time when the load balancer checks, it may be very busy at a later time in between status checks. In such instances a particular server device can be assigned too much work and thus the respective browsers would have to wait for a long time before receiving the requested information.

Also, with the above known architecture browser requests are taken one at a time by the load balancer and assigned to server devices in the order in which they were received. However, this is disadvantageous because a browser requesting only text would have to wait for a long time while previously received graphics requests are being served (graphics requests involve much more data to be transferred than text because graphics contain much more information than text). Also, if it were particularly more important for one browser user to gain access before the others, there is no mechanism which provided for this in the prior architecture. Each request had to wait its turn.

Also, if there is a particular period of extremely high demand where all available server devices are extremely busy, the browsers are made to wait a long time before having their requests served.

The performance of this architecture is further impaired since each received browser request must be served and a reply sent back to the browser before an initial connection can be made with respect to another browser request.

The present invention has been developed with these limitations in the prior architecture in mind.

SUMMARY OF THE INVENTION

According to one aspect, the present invention provides a high-availability computer server system capable of serving a large number of requests received from a plurality of computer client devices connected through a network to said server system, said requests specifically identifying said server system, said server system comprising: a messaging and queuing unit having an input connected to said network upon which said requests identifying said server system are received, and an output; and a plurality of server units connected in parallel to said output of said messaging and queuing unit.

By using a messaging and queuing unit, the present invention prevents servers which receive requests from the unit from being overloaded, because the servers "pull" requests off of the queue (in the unit) as opposed to a load balancer "pushing" requests onto the servers without the servers asking for such requests. The server system and thus the overall client/server system thus work much more efficiently to serve client requests, especially in high volume situations where a server system receives a large amount of requests nearly simultaneously.

According to another aspect, the invention provides a method of serving requests received from a plurality of client computer devices via a computer network, each of said requests specifically identifying a specific server system, said method comprising steps of: storing, at said specific server system, said received requests into a messaging and queuing unit; and sending requests from said messaging and queuing unit to a plurality of parallel-connected server units.

According to another aspect, the present invention provides a client/server computer system having a high availability computer server system capable of serving a large number of requests received from a plurality of computer client devices connected through a network to said server system, said requests specifically identifying said server system, said server system comprising: a messaging and queuing unit having an input connected to said network upon which said requests identifying said server system are received, and an output; and a plurality of server units connected in parallel to said output of said messaging and queuing unit.

DETAILED DESCRIPTION OF THE PREFERRED EMBODIMENTS

Figure 1:
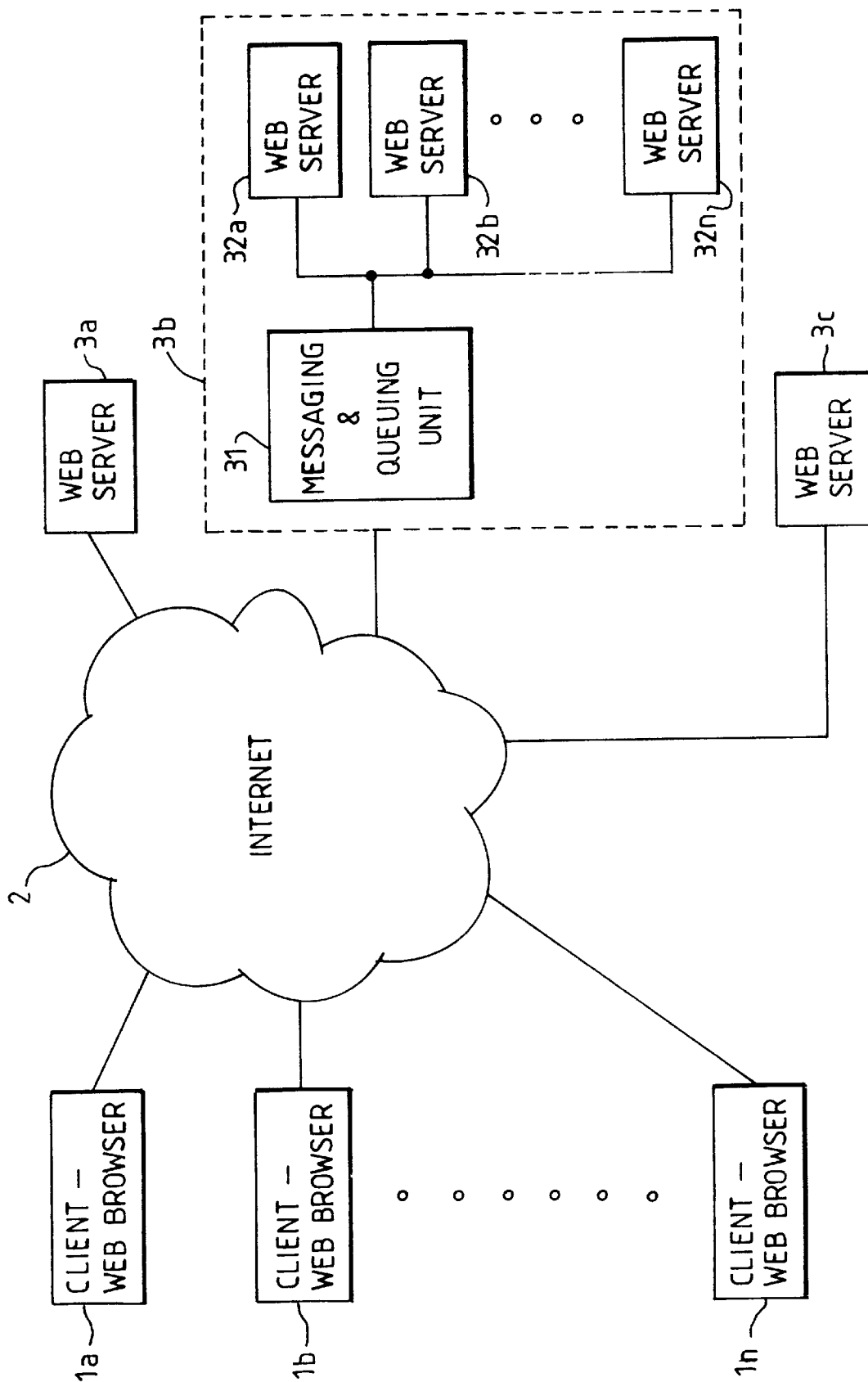
FIG. 1 is a block diagram showing a network system architecture including a server system according to a preferred embodiment of the present invention.

As shown in FIG. 1, the system architecture to which a preferred embodiment of the present invention pertains includes a plurality of client Web browsers 1a through 1n connected to the Internet 2. A plurality of Web servers 3a, 3b and 3c are also connected to the Internet 2. Each client Web browser 1a–1n can access information stored on a Web server 3a–3c by sending a request specifically identifying the requested Web server over the Internet 2, as described above.

Web server 3b is shown in further detail in FIG. 1, as this server illustrates a server architecture according to a preferred embodiment of the present invention. Server 3b is a high availability server capable of serving many more requests than the other two normal availability servers 3a and 3c. Server 3b, for example, is providing sports scores for a popular international sporting event and is thus being accessed by browsers all over the world at almost the same time. Server 3b must thus be able to deal with this large volume of near simultaneous requests.

As shown, server 3b is broken up into a messaging and queuing unit 31 and a plurality of normal availability web servers 32a–32n. Web servers 32a–32n can be, for example, identical to the other servers 3a and 3c. Messaging and queuing unit 31 is a software product which can be running on one of the servers 32a–32n or on a separate server machine included within server architecture 3b. The details of the messaging and queuing software unit 31 are well known in the art, however, a brief background description of such a unit will now be given to explain its function with respect to the disclosed embodiment of the present invention.

An alternative communication model to the synchronous, time-dependent 'request and await response' model (as usually used in the WWW environment) is asynchronous messaging known in the art as "messaging and queuing". A program which sends a message to a receiver program need not be blocked to await a reply from the receiver and so can continue executing, and the sender and receiver are not synchronised (serialised) with one another. Asynchronous inter-program messaging typically uses message queues as intermediate storage facilities into which messages are placed when sent from a first program and from which they can be retrieved by a receiver program when it is ready. There is no dedicated logical connection between the programs. After placing a message in a queue, the sender program can proceed to execute other tasks which may involve sending messages to other programs in the network. It is known in the art to provide asynchronous messaging systems which support inter-program communication across heterogeneous networks, and which shield application programs (which are each written for a particular operating system environment) from the complexities of the network and from the work of maintaining and locating message queues. Such messaging systems are important to many commercial enterprises who need to achieve effective inter-operation between their various business application programs but whose data processing resources comprise a range of disparate operating system and hardware environments.

Message queuing and commercially available message queuing products are described in "Messaging and Queuing Using the MQI", B. Blakeley, H. Harris & R. Lewis, McGraw-Hill, 1994, and in the following publications which are available from IBM Corporation: "An Introduction to Messaging and Queuing" (IBM Document number GC33-0805-00) and "MQSeries-Message Queue Interface Technical Reference" (IBM Document number SC33-0850-01). IBM and MQSeries are trademarks of IBM Corporation. IBM's MQSeries messaging software products provide transactional messaging support, synchronising messages within logical units of work in accordance with a messaging protocol which gives assured once and once-only message delivery even in the event of system or communications failures. MQSeries products provide assured delivery by not finally deleting a message from storage on a sender system until it is confirmed as safely stored by a receiver system, and by use of sophisticated recovery facilities. Prior to commitment of transfer of the message upon confirmation of successful storage, both the deletion of the message from storage at the sender system and insertion into storage at the receiver system are kept 'in doubt' and can be backed out atomically in the event of a failure. This message transmission protocol and the associated transactional concepts and recovery facilities are described in international patent application WO 95/10805 and U.S. Pat. No. 5465328, which are incorporated herein by reference.

Figure 3:
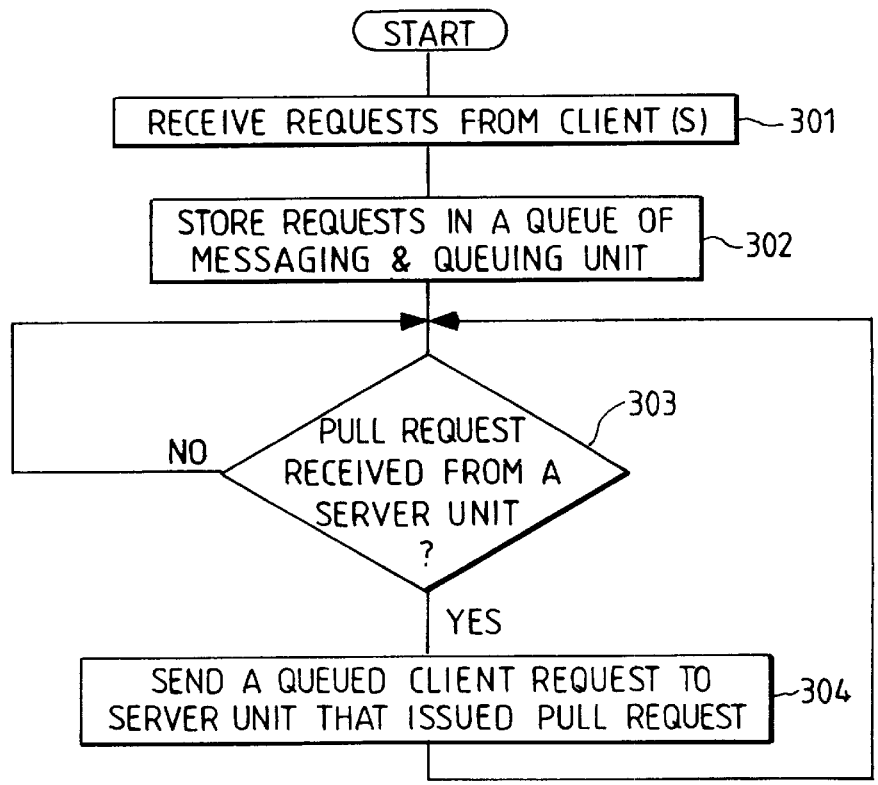
FIG. 3 is a flowchart showing methods steps carried out by a server according to a preferred embodiment of the present invention.

As requests (messages) having URL's specifying server 3b are received (step 301 of FIG. 3) from client web browsers 1a–1n over the Internet, messaging and queuing unit 31 of server 3b receives and stores (step 302) the requests in a queue. The web servers 32a–32n inform (step 303) the messaging and queuing unit 31 when they are ready to receive a request from the queue. That is, when server 32a has finished serving previous requests and is now sitting idly, it sends a message to the messaging and queuing unit 31 asking for another request to serve. The same applies for the other servers 32b–32n. Messaging and queuing unit 31 then sends (step 304) a queued client request to a server unit in response to having received a request from the server unit for a client request. This is known as a "pull" model since servers 32a–32n "pull" requests off of the queue when they are ready. This has the advantage of not overloading a server since it is not given any work to do until it asks for such work. Servers 32a–32n can thus operate much more efficiently and effectively.

A unique correlation identifier is assigned to each HTTP request as it is received by messaging and queuing unit 31. A received request is then placed on the request queue of unit 31. The unit 31 then waits (by suspending a blocking MQGET call) until a server 32a–32n which indicated that it was ready to receive a request returns a reply having the assigned correlation identifier to unit 31. The reply is stored in an HTTP reply queue in unit 31 and sent back to the browser 1a–1n that initiated the request.

Web servers 32a–32n are adapted so that instead of monitoring their usual port (port 80 for most servers) for HTTP requests (as the other servers 3a and 3c do) they monitor the request queue of unit 31. Alternatively, a bridge program could be run alongside a respective server 32a–32n to monitor the request queue of unit 31 and supply requests to port 80 of the server. In this latter configuration, the server's reply would be received by the bridge program and translated into a message to be added to the HTTP reply queue of unit 31.

Figure 2:
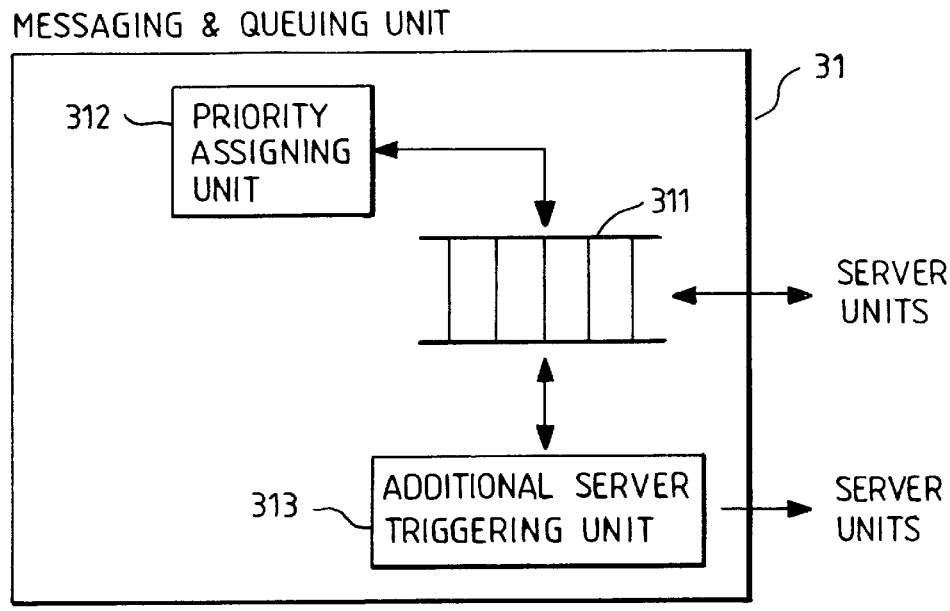
FIG. 2 is a block diagram showing some well-known functional units of a messaging and queuing unit, which are used in the preferred embodiment of the present invention.

By using a messaging and queuing unit between the Internet and a plurality of parallel-connected servers, messages stored in the messaging and queuing unit 31 can be prioritized using well-known messaging and queuing techniques. FIG. 2 shows a priority assigning unit 312, which assigns priorities to client request that are stored in queue 311, both of these elements are parts of the well-known structure of a messaging and queuing unit. For example, if one client Web browser 1a is requesting textual information (e.g., sports scores) and another client Web browser 1b is requesting graphical data (a colour picture of the sports arena), it would be useful to be able to serve the textual information first, as the graphical information takes much longer to serve as it is much more data intensive. Browser 1a would thus be quickly served the simple text request. Browser 1b would expect to wait longer for the graphics request and thus it is highly advantageous to serve the text request first. The two HTTP requests stored in the queue of unit 31 are examined by looking at the extensions of their URL's. If the extension refers to text (HTML) this HTTP request is moved ahead of a request having an extension GIF (signifying graphical image data).

Also, a well-known triggering feature (see additional server unit triggering unit 313 in FIG. 2) of messaging and queuing unit 31 can be employed to "wake up" additional servers 32a–32n if the queued messages surpass a threshold number. That is, there may be times of low usage where it is not desirable to have all of the servers 32a–32n active. There are other times of high usage when more servers of the set 32a–32n should be active. Thus, messaging and queuing unit 31 periodically checks the number of queued requests and if it is higher than a threshold amount, additional servers can be triggered to turn on during these periods of high usage.

Further, since messaging and queuing unit 31 accepts an Internet connection for each request and places the received HTTP request in a queue, it can then quickly service the next request by immediately accepting another connection. In prior architectures it was necessary to wait until a received request was served by a server and a reply sent back through the opened connection before another connection could be accepted to receive the next request from the Internet.

Accordingly, the performance and availability of Web Servers can be greatly enhanced according to the preferred embodiment of the present invention. While the preferred embodiment has been described in the context of the World Wide Web as the network, many other networks of connected computer devices are also within the scope of the invention.

We claim:

1. An Internet World Wide Web (WWW) computer server system which serves requests received from a plurality of WWW browser computer client devices connected through the Internet to said server system, said requests specifically identifying said server system, said server system comprising:

a messaging and queuing unit having an input connected to the Internet upon which said requests identifying said server system are received, and an output; and a plurality of server units connected in parallel to said output of said messaging and queuing unit, wherein each server unit pulls requests off of a queue included in said messaging and queuing unit.

2. The system of claim 1 wherein said messaging and queuing unit includes means for assigning priority to received requests.

3. The system of claim 2 wherein said means for assigning priority assigns higher priority to text requests as compared to graphics requests.

4. The system of claim 1 wherein said messaging and queuing unit includes means for triggering an additional server unit as the number of unserved requests received by said messaging and queuing unit surpasses a threshold amount.

5. The system of claim 1 wherein said messaging and queuing unit includes means for sending a request to one of said plurality of server units in response to said server unit informing said messaging and queuing unit that said server unit is ready to serve a request.

6. A method of serving Internet World Wide Web (WWW) requests received from a plurality of WWW browser client computer devices via the Internet, each of said requests specifically identifying a specific WWW server system, said method comprising steps of:

storing, at said specific server system, said received requests into a messaging and queuing unit; and sending requests from said messaging and queuing unit to a plurality of parallel-connected server units in response to the receipt of pull requests from the server units.

* * * * *